(No Model.)

MacD. PATE.
ATTACHMENT FOR PLOWS.

No. 385,773. Patented July 10, 1888.

Witnesses.
W. Fred Keller.
W. R. Bears.

Inventor,
MacDonald Pate,
By Parker H. Sweet Jr.
Attorney.

United States Patent Office.

MacDONALD PATE, OF SNOW HILL, NORTH CAROLINA.

ATTACHMENT FOR PLOWS.

SPECIFICATION forming part of Letters Patent No. 385,773, dated July 10, 1888.

Application filed October 31, 1887. Serial No. 253,879. (No model.)

*To all whom it may concern:*

Be it known that I, MACDONALD PATE, a citizen of the United States, residing at Snow Hill, in the county of Greene and State of North Carolina, have invented certain new and useful Improvements in Attachments for Plows; and I do hereby declare the following to be a full, clear, and exact description of the invention, such as will enable others skilled in the art to which it appertains to make and use the same.

My invention has for its object to provide an improved and novel attachment for the ordinary turn-plow, whereby said plow may be rendered capable of use as a plow and cultivator, or as a plow and cotton and corn scraper combined, according to the character of the work which it may be desired to accomplish therewith, the said attachment being simple in construction, reliable in operation, and capable of ready adjustment to suit the requirements of the work intended.

To the above ends my invention consists, essentially, of an auxiliary mold-board or scraper of peculiar configuration, which is adapted for ready attachment to the landside of the plow and capable for use, as will be hereinafter fully described, and specifically designated in the claim.

Figure 1:
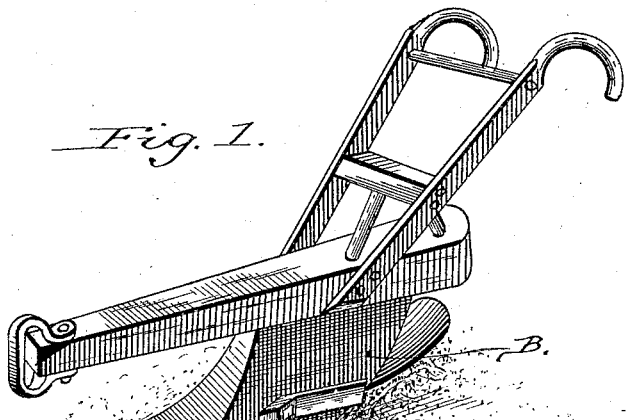
Figure 2:
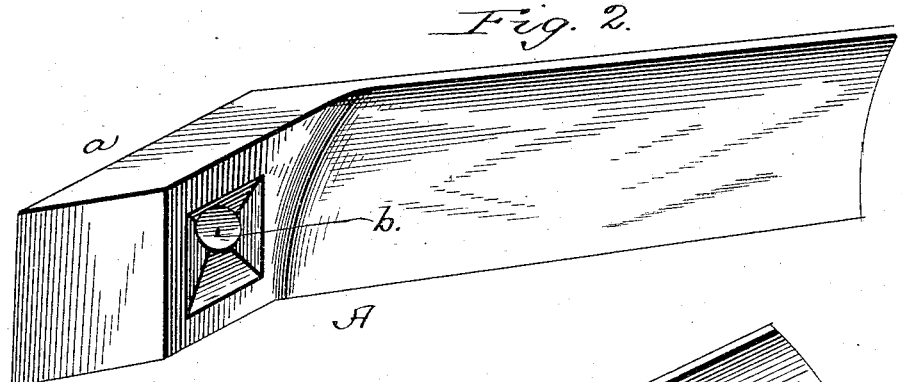
Figure 3:
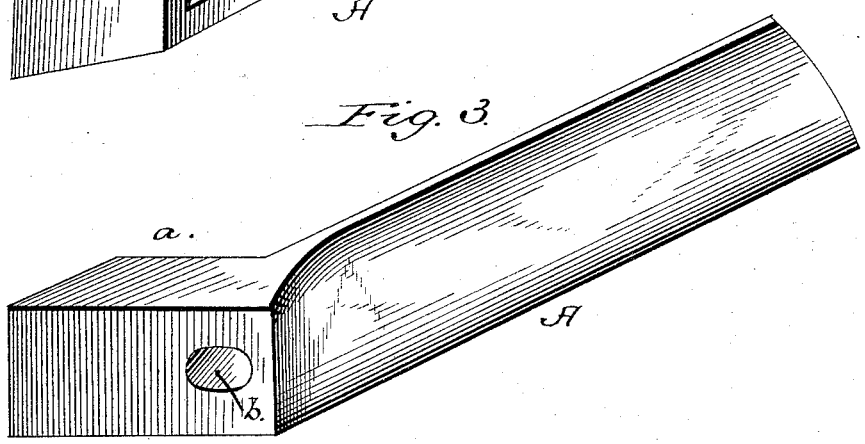

In the accompanying drawings, Figure 1 represents a perspective view of an ordinary turn-plow with my improved device in position thereon, and Figs. 2 and 3 represent detail views of the device as detached from the plow.

Similar letters of reference occurring on the several figures of the drawings indicate like parts.

Referring to the said drawings, the letter A designates my improved attachment, which consists of an elongated arm projecting at an acute angle from an enlarged base, $a$, formed integral therewith, the said arm being slightly curved from its lower to its upper edge, and the lower edge tapering, preferably, to a sharp point, as shown.

The attachment thus described is secured to the landside of the bar B of the common turn-plow by means of the bolt C, which passes through the opening $b$ in the enlarged base $a$ of the attachment, thence through the bar B and its retaining-plate, and held in place by a suitable tap, the same tap and bolt being preferably used that are employed to secure the bar to the plow. When secured in position, the curved arm or auxiliary mold-board A projects outwardly and upwardly from the face of the bar B, the desired degree of angle being easily regulated by setting the arm in the proper position and tightening the bolt to secure it rigidly to the bar.

By means of my improvement the ordinary turn-plow is rendered capable of doing the work both of a cultivator and plow, the attachment serving to throw fresh dirt between the plants to cover and destroy the weeds, or, if set at the proper angle, to act as a chopper or scraper, it being only necessary to adjust the arm A to suit the various requirements of cultivation, and only requiring two furrows to the row to thoroughly and effectively cultivate the plants.

Having thus described my invention, what I claim as new, and desire to secure by Letters Patent, is—

An attachment for the landside of a plow, consisting of an elongated arm having a concaved outer face, and a base to which said arm is secured, having an inclined front edge, said arm extending out at an acute angle from said base, substantially as described.

In testimony whereof I affix my signature in presence of two witnesses.

MACDONALD PATE. [L. S.]

Witnesses:
 JNO. D. GRIMSLEY,
 THEO. EDWARDS.